United States Patent
Abe

[19]

[11] Patent Number: 5,946,109
[45] Date of Patent: Aug. 31, 1999

[54] PICTURE IMAGE INPUT METHOD

[75] Inventor: Kouji Abe, Hiratuka, Japan

[73] Assignee: Nikon Corporation, Tokyo, Japan

[21] Appl. No.: 08/845,481

[22] Filed: Apr. 25, 1997

[30] Foreign Application Priority Data

Jun. 21, 1996 [JP] Japan ................................. 8-161533

[51] Int. Cl.$^6$ ................................................ H04N 1/04
[52] U.S. Cl. ...................... 358/474; 358/453; 382/299
[58] Field of Search .................... 358/451, 452, 358/487, 453, 474; 382/298, 299, 318, 319, 172, 167; 395/102; 396/228; 348/254

[56] References Cited

U.S. PATENT DOCUMENTS

| | | | |
|---|---|---|---|
| 4,077,043 | 2/1978 | Nanba | 396/228 |
| 4,651,226 | 3/1987 | Motoori et al. | 358/497 |
| 5,325,311 | 6/1994 | Yamada et al. | 382/167 |
| 5,522,657 | 6/1996 | Jamzadeh et al. | 358/302 |
| 5,651,077 | 7/1997 | Dong et al. | 382/172 |
| 5,796,877 | 8/1998 | Gusmano | 382/298 |

*Primary Examiner*—Joseph Mancuso
*Assistant Examiner*—Vikkram Bali
*Attorney, Agent, or Firm*—Oliff & Berridge, PLC

[57] ABSTRACT

It is an objective of the present invention to make it possible to reproduce the coloration and brightness of the original picture image with good accuracy.

In a method step the picture image input region is designated following instructions from the user, and then the area of the picture image input region which is designated is computed following a program stored in a Read-Only-Memory. Furthermore, in another step, the resolution is computed such that the pixels input in the designated area are greater in number than the minimum number of pixels stipulated beforehand.

14 Claims, 4 Drawing Sheets

PICTURE IMAGE INPUT METHOD

The disclosure of the following priority application is herein incorporated by reference: Japanese Publication 8-161533, filed Jun. 21, 1996.

BACKGROUND OF THE INVENTION

1. Field of Invention

The present invention relates to a picture image input method which optically inputs the picture image of an original medium.

2. Description of Related Art

A picture image input apparatus (scanner) optically inputs and photoelectrically converts the picture image of an original medium, and outputs this picture image as electronic data.

In this kind of scanner, when the picture image of an original medium is input, a look-up table (LUT) is necessary in order to reproduce the object image. This look-up table is, for example, one in which a table used to revise variances characteristic of the apparatus and a table used for picture image adjustment according to commands from the user are merged.

In the picture image input of a negative film (negative original medium) which is a transmissive original medium, the negative gradation conversion table which is used to convert the negative to a positive is also merged into the look-up table.

Furthermore, in the picture image input of a negative film, it is necessary to perform a prescan in order to create this negative gradation conversion table. With the exception of creating the negative gradation conversion table, this prescan performs the same actions as the normal scan during picture image input.

This negative gradation conversion table creation is started, for example, by commands from a host computer to which the scanner is connected.

First, the scanner receives from the host computer the resolution, the picture image input range and the data in the look-up table into which the negative gradation conversion table which is the basis is merged. Furthermore, the scanner, upon receiving from the host computer a command to start scanning, starts the prescan using this look-up table.

Next, the scanner creates a histogram of the brightness of the input picture image and the frequency thereof from the picture image data input through the prescan.

Furthermore, a shadow point used to match a white point is found from this histogram. The white point is the location where the value of the output of the negative gradation conversion table is a maximum. In addition, the shadow point is the darkest location on the negative film, and is the brightest location in the original object. That is to say, the white point is the brightest location in the original object, and is the point which should be the brightest location in the data from the negative-to-positive conversion of the picture image which was input.

For example, from the histogram which is obtained, the brightness value is added in the high direction from level 0, and the value immediately prior to where the cumulative frequency value crosses 0.3% (cumulative frequency coefficient 1) of the total is made the shadow point S.

Conversely, the frequency value is added from the maximum level (4095 in the case of a 12-bit table) in the low direction, and the value immediately prior to where the cumulative frequency value crosses 0.03% (cumulative frequency coefficient 2) of the total is made the highlight point H.

Through the above, the highlight point and shadow point of the negative gradation conversion table are determined.

In the scanner, the negative gradation conversion table obtained as described above is merged into the look-up table, and the picture image data input by the actual picture image input is converted using this and is sent to the host computer.

However, in the above-described prescan the following problems arise because the resolution is fixed regardless of the region over which the picture image is input.

First, when the region in which the picture image is input in the prescan is widened, the data volume which is input increases, causing the time needed for the prescan action to become long.

On the other hand, when the region in which the picture image is input in the prescan is made too small, the data volume which is input diminishes, so that accuracy in the obtained histogram cannot be achieved, and as a result, the quality of the negative gradation conversion table that is obtained worsens

SUMMARY OF THE INVENTION

In consideration of the foregoing, it is an objective of the present invention to make it possible to reproduce the coloration and brightness of the original picture image with good accuracy.

The picture image input method of the present invention is one wherein the area of the picture image input region where the picture image is input is found, the required minimum resolution is computed by dividing the required number of pixels set beforehand in the picture image input region by the area of the picture image input region, and inputting the picture image of the picture image input region is accomplished at this required minimum resolution.

If the picture image input region is small, the required minimum resolution becomes higher, and if the picture image input region is large, the required minimum resolution becomes lower.

DETAILED DESCRIPTION OF THE PREFERRED EMBODIMENTS

Hereafter, an embodiment of the present invention will be described with reference to the drawings.

Figure 1:
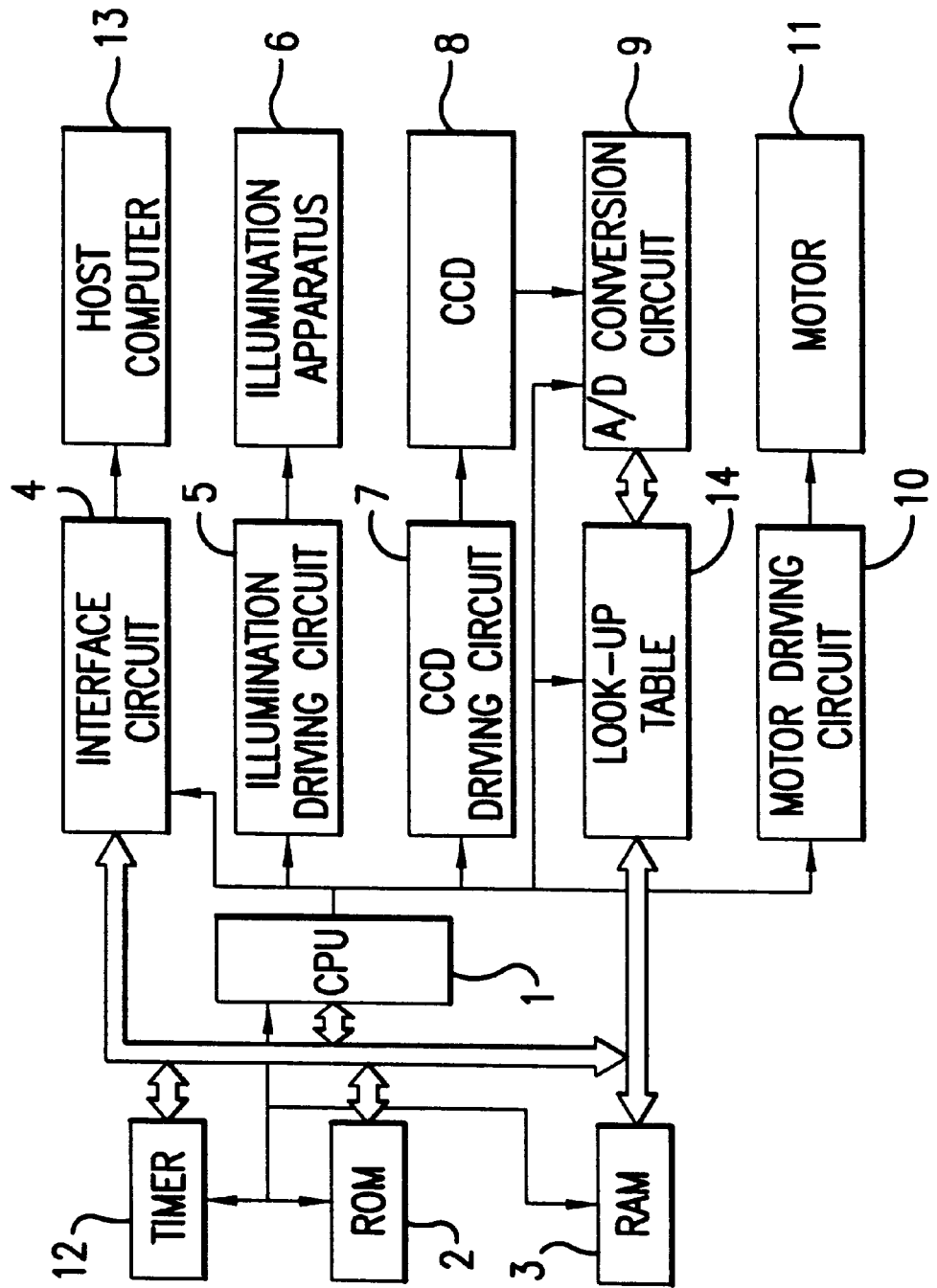
FIG. 1 is a block diagram showing the composition of a picture image input system in an embodiment of the present invention.

FIG. 1 is a block diagram showing the composition of a picture image input system in a first embodiment of the present invention.

As shown in FIG. 1, a CPU 1 controls the actions of the various components and executes the picture image input actions following a program stored in a ROM 2.

In a RAM 3, the CPU 1 temporarily stores data which are necessary in executing the various processes.

An interface circuit 4 is connected to a host computer 13, and this circuit outputs to the host computer 13 data which has been input and receives and transfers to the CPU 1 instructions and commands from the host computer 13.

An illumination driving circuit 5 is controlled by the CPU 1, drives an illumination apparatus 6 and causes light which is red R, green G and blue B to illuminate the original medium which is the object of picture image input. Here, the assumption is that a negative film which is a transmissive original medium is used as the negative original medium, although such is not represented in the drawings.

A CCD driving circuit 7 is controlled by the CPU 1 and reads the original medium by driving a CCD 8.

Furthermore, the picture image data output from the CCD 8 is input into an A/D (Analogue/Digital) conversion circuit 9 and after undergoing A/D conversion is sent to the RAM 3 and stored there. Furthermore, this data undergoes a conversion process by a look-up table 14.

In addition, a motor driving circuit 10 is controlled with a preset timing by the CPU 1, and causes the original medium to move in increments of one line by driving a motor 11. A timer 12 temporarily performs a timing action, and supplies the time information to the CPU 1.

This is the composition of the scanner, with the exception of the above-described host computer 13.

Figure 2:
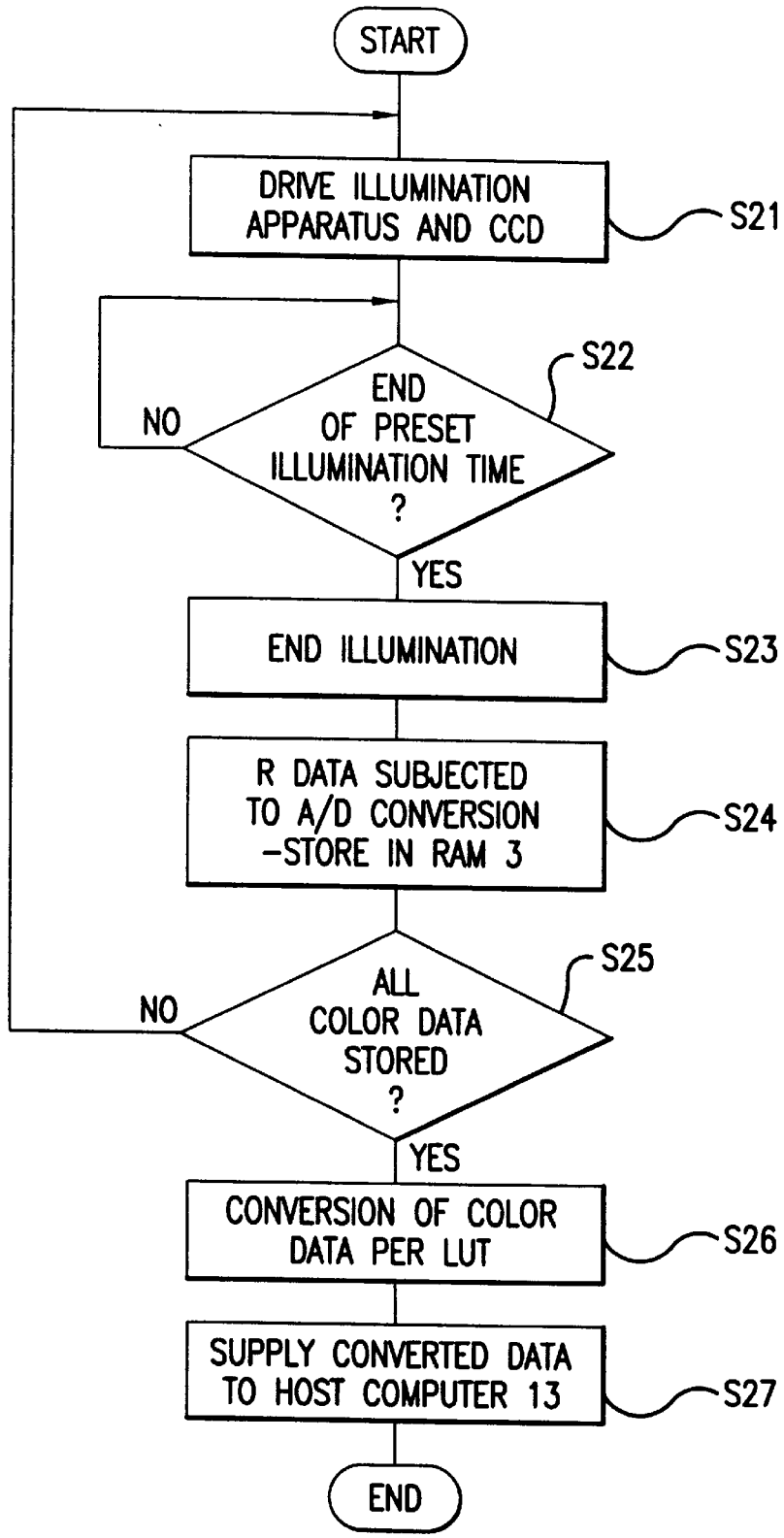
FIG. 2 is a flowchart showing the basic actions of the picture image input system of FIG. 1.

Next, the basic actions of this picture image input system will be described using the flowchart in FIG. 2.

First, in step S21, the CPU 1 causes the illumination apparatus 6 to be driven by controlling the illumination driving circuit 5. Through this, the illumination apparatus 6 first illuminates the original medium with R light. Furthermore, the CPU 1 starts measuring this R light illumination time using the time information simultaneously obtained from the timer 12.

On the other hand, the CPU 1 causes the CCD 8 to be driven by controlling the CCD driving circuit 7, and accomplishes input of the original medium picture image through illumination by the illumination apparatus 6.

Through this, the CCD 8 accumulates the light corresponding to the R picture image of one line.

Next, in step S22, the CPU 1 determines whether or not the measured time is a preset value. That is to say, the CPU 1 determines whether or not the preset illumination time has been completed.

When the CPU 1 determines that the preset illumination time has been completed, the program moves to step S23 and the CPU 1 causes the illumination apparatus 6 to halt by controlling the illumination driving circuit 5, and the illumination is completed. When the illumination time is not completed, the CPU 1 continues to cause the illumination apparatus 6 to be driven by controlling the illumination driving circuit 5.

Next, in step S24, the CPU 1 causes the R data accumulated in the CCD 8 to be output to the A/D conversion circuit 9. Furthermore, the CPU 1 causes the R data received by the A/D conversion circuit 9 to undergo A/D conversion. Furthermore, the CPU 1 sends the data which has been A/D converted to the RAM 3 and stores this data there.

Furthermore, in step S25, the CPU 1 determines whether or not the above-described data input has been completed in all of the colors RGB. Furthermore, when it is determined that this has been completed in all colors, the program moves to the ensuing step S26.

That is to say, the above-described series of actions consisting of light illumination, picture image input, A/D conversion and data storage is performed for the three colors RGB, and following this the program moves to the ensuing step S26.

Next, the CPU 1, in step S26, performs a conversion process on the data stored in the RAM 3 using the look-up table 14.

When this conversion process has been completed, the CPU 1, in step S27, sends the data which has undergone the conversion process to the host computer 13 via the interface control circuit 4.

As a result of the above-described operations, inputting of one line of picture image data is accomplished.

Furthermore, the CPU 1 supplies the line start trigger signal to the motor driving circuit 10, and causes the motor 11 to be driven to cause the relative position between the original medium and the CCD 8 to move by one line. Furthermore, the actions in above-described steps S21 through S27 are repeated and the picture image input of the next one line is accomplished. By repeating the above for a predetermined number of lines, the picture image data for the whole original medium is input.

In picture image input from a negative film, a negative gradation conversion table is created through a prescan, as described above, and this is merged into the look-up table 14.

Hereafter, the creation of this negative gradation conversion table (look-up table 14) will be described with reference to FIG. 3 and FIG. 4.

In the above-described picture image input system, a negative picture image input set up is accomplished. Furthermore, in order to obtain the information needed for this set up, picture image input is broadly accomplished by performing a prescan in the picture image input system and the negative gradation conversion table is created.

Figure 3:
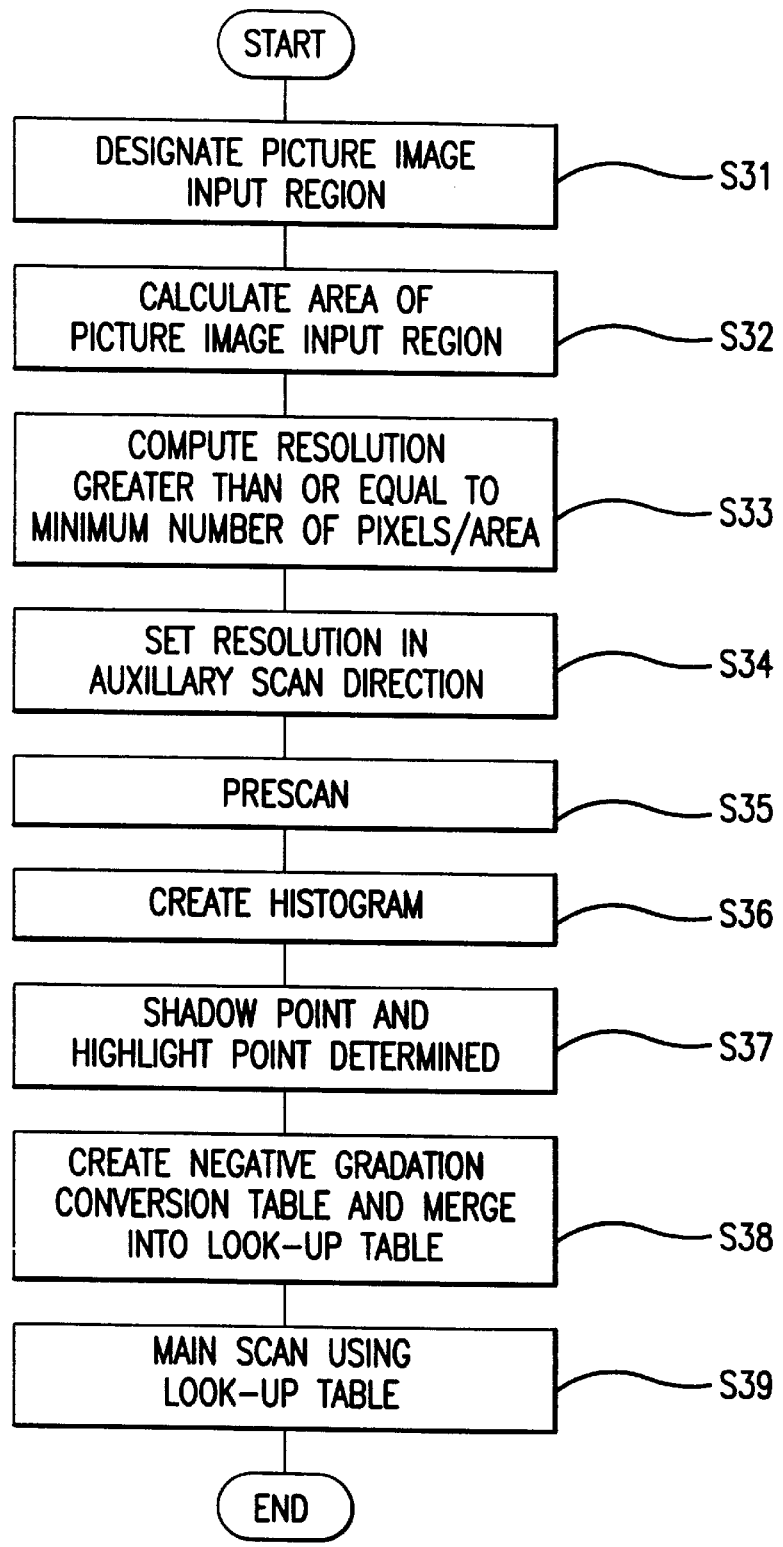
FIG. 3 is a flowchart relating to the creation of the negative gradation conversion table.
Figure 4:
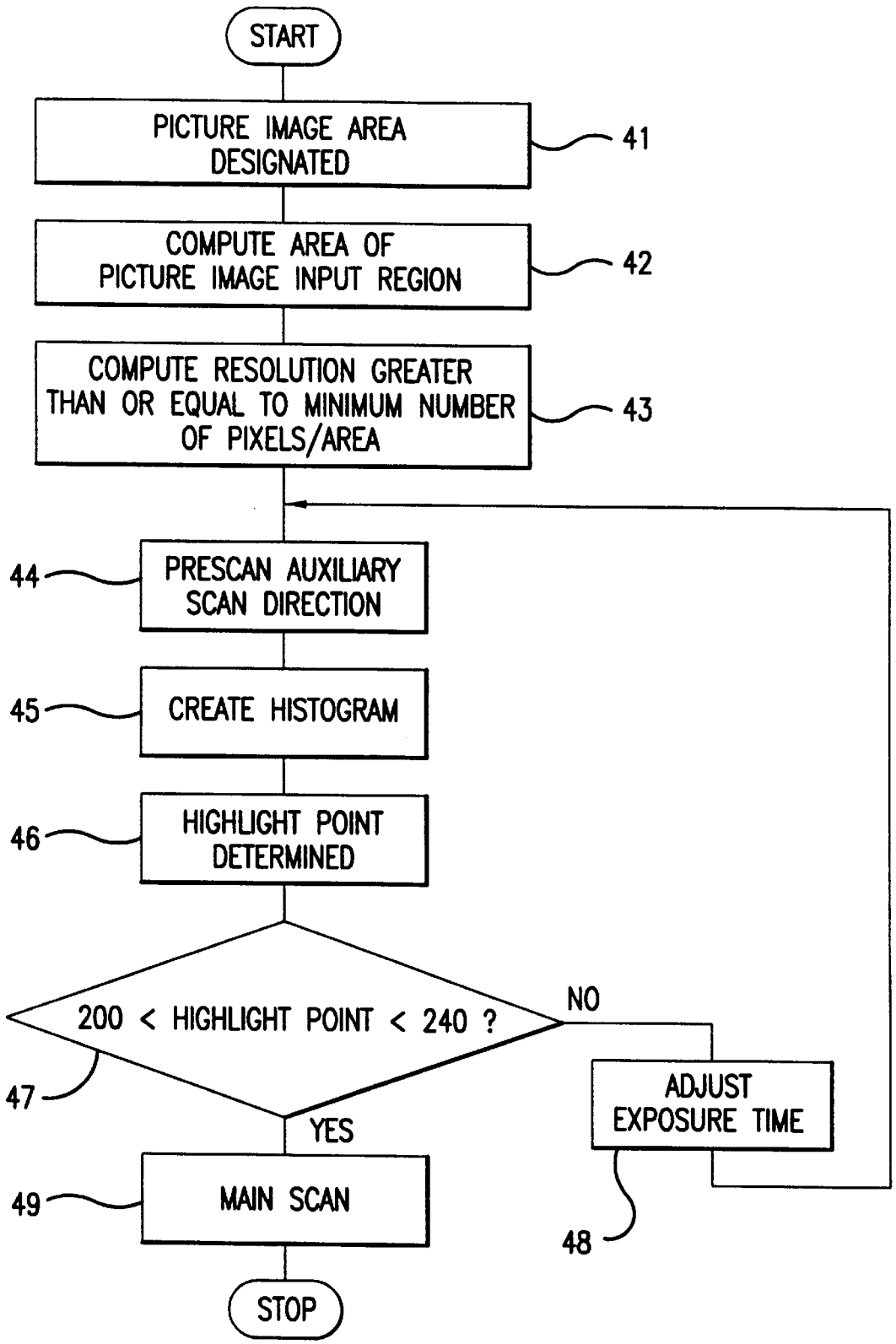
FIG. 4 is a flowchart showing the actions when exposure reading is accomplished.

The creation of this negative gradation conversion table is accomplished as shown in the flowchart in FIG. 3.

First, in step S31 the picture image input region is designated following instructions from the user, and then in step S32 the CPU 1 computes the area of the picture image input region which is designated, following a program stored in the ROM 2. The designation of this picture image input region may be accomplished by designating the coordinates of the opposing corners of a square region where the picture image is input, and in addition, the designation of a standard film such as "35 mm film" or "4×5 film" or the like may be made.

Next, in step S33, the CPU 1 computes the resolution so that the pixels input in the designated region are greater in number than the minimum number of pixels stipulated beforehand. For example, an integer larger than the value obtained by dividing the minimum number of pixels by the area obtained in step S32 is set as the resolution.

However, when the area of the designated picture image input region is too small, the computed resolution becomes larger than the input resolution. Accordingly, in order to avoid this, when the minimum input range is determined and the picture image input region is set smaller than this, the prescan is accomplished by extending the region to the minimum input range uniformly in each direction.

In addition, when the picture image input region which is set is in a corner of the entire region and cannot be extended uniformly to the minimum input range, the region is extended in the directions in which extension is possible.

Furthermore, the CPU 1, in step S34, sets the resolution which was obtained. The setting of this resolution is the setting of the input resolution in the auxiliary scanning direction in picture image input. This is because the input resolution in the main scanning direction is fixed.

Next, the CPU 1, in step S35, performs a prescan at the set resolution. In this prescan, picture image input is performed using a negative gradation conversion table with linear properties as the base.

Furthermore, the CPU 1, in step S36, creates a histogram from the picture image data input by the prescan. That is to say, the histogram is created by adding the number of pixels for each RGB to each brightness level through the picture image input by the prescan.

Furthermore, the CPU 1, in step S37, finds the shadow point in order to accomplish white point matching when negative-positive reversal is accomplished.

In addition, the CPU 1 finds the highlight point in order to match the scale of the brightness value output from the scanner among RGB.

In this step S37, frequency values are added toward the high direction from level 0 in the histogram, and the value immediately prior to where the cumulative frequency value exceeds 0.3% (cumulative frequency coefficient 1) of the total number of pixels is set as the shadow point $S_c$ (c=R, G, B).

Conversely, the frequency value is added from the maximum level (4095 in the case of a 12-bit table) in the low direction, and the value immediately prior to where the cumulative frequency value crosses 0.03% (cumulative frequency coefficient 2) of the total is made the highlight point $H_c$ (c=R, G, B).

Furthermore, these are respectively found for each of RGB.

Next, the CPU 1, in step S38, creates the negative gradation conversion table from the highlight point and shadow point which are found through the above, and merges this table into the look-up table 14.

Furthermore, in step S39, the CPU 1 performs the main scan using the look-up table 14 which has been obtained.

In accordance with the above-described first embodiment, a number of pixels at least as large as a fixed value are input, and consequently the problem is avoided of a histogram not being obtainable with the required amount of information because of the number of pixels in the input picture image being too small.

In addition, in the picture image input action of the prescan, the problem is avoided of the scan time becoming excessively long because of the number of pixels in the input picture image being larger than necessary.

In the above description, the CPU 1 creates a negative gradation conversion table, but this is intended to be illustrative and not limiting.

It would also be acceptable for the CPU 1 to first send the data which is input by the prescan to the host computer 13 via the interface control circuit 4 and for the negative gradation conversion table to be created in the host computer 13.

Furthermore, it would also be acceptable for the negative gradation conversion table created in the host computer 13 to be passed to the CPU 1 via the interface control circuit 4 and to be merged into the look-up table 14.

In the above-described first embodiment, the prescan is performed when the negative gradation conversion table is created, but the prescan can also be performed when exposure reading is accomplished. Accordingly, it is possible to apply the present invention to the prescan for this exposure reading also.

Hereafter, the actions of exposure reading through the scanner of FIG. 1 will be described with reference to the flowchart in FIG. 4.

First, in step S41 the picture image input region is designated following instructions from the user, and then in step S42 the CPU 1 computes the area of the picture image input region which is designated, following a program stored in the ROM 2. The designation of this picture image input region may be accomplished by designating the coordinates of the opposing corners of a square region where the picture image is input, and in addition, the designation of a standard film such as "35 mm film" or "4×5 film" or the like may be made.

Next, in step S43, the CPU 1 computes the resolution so that the pixels input in the designated region are greater in number than the minimum number of pixels stipulated beforehand. For example, an integer larger than the value obtained by dividing the minimum number of pixels by the area obtained in step S42 is set as the resolution.

This resolution is the input resolution (pitch) of the auxiliary scanning direction in picture image input. This is because the input resolution in the main scanning direction is fixed.

The resolution of the auxiliary scanning direction in standard film which is required from the above-described minimum number of pixels is, for example, as shown in Table 1 hereafter.

TABLE 1

| Input Range | Auxiliary Scanning Resolution |
|---|---|
| 35 mm film or less | 100 dpi |
| from 35 mm film to 4 × 5 film | 50 dpi |
| from 4 × 5 film to 8 × 12 inch or greater | 30 dpi |

However, when the area of the designated picture image input region is too small, the computed resolution becomes larger than the input resolution. Accordingly, in order to avoid this, when the minimum input range is determined and the picture image input region is set smaller than this, the prescan is accomplished by extending the region to the minimum input range uniformly in each direction.

In addition, when the picture image input region which is set is in a corner of the entire region and cannot be extended uniformly to the minimum input range, the region is extended in the directions in which extension is possible.

Next, the CPU 1, in step S44, performs a prescan at the set resolution (pitch). In this prescan, picture image input is performed using the exposure time which has been basically set.

Furthermore, the CPU 1, in step S45, creates a histogram from the picture image data input by the prescan.

Furthermore, the CPU 1, in step S46, finds the highlight point HP.

Next, the CPU 1 determines whether or not the highlight point HP which has been obtained is larger than the brightness value 200 and smaller than the value 240.

When the value is smaller than the brightness value 200, the exposure is insufficient, and when the value is larger than 240, the exposure is excessive.

When it is determined that 200<HP<240 in this determination, the program moves to the ensuing step S49, and the CPU 1 starts the main scan.

When the CPU 1 determines in the determination in step S47 that the highlight point HP which has been obtained is outside the range, the program moves to step S48, and the CPU accomplishes adjustment of the exposure time.

That is to say, when it is determined that 240 # HP, the CPU 1 changes the setting so that the exposure time is shortened. In addition, when it is determined that HP # 200, the CPU 1 changes the setting so that the exposure time is lengthened. This setting is accomplished by changing the exposure time using the timer 12.

Furthermore, the CPU 1 returns to step S44 and verifies the exposure status through the picture image data which is input by the prescan the same as above.

Through the above, with this second embodiment a number of pixels at least as large as a fixed value are input, and consequently the problem is avoided of a histogram not being obtainable with the required amount of information because of the number of pixels in the input picture image being too small.

In addition, in the picture image input action of the prescan, the problem is avoided of the scan time becoming excessively long because of the number of pixels in the input picture image being larger than necessary.

In the above description, the CPU 1 creates a histogram and finds the highlight point, but this is intended to be illustrative and not limiting.

It would also be acceptable for the CPU 1 to first send the data which is input by the prescan to the host computer 13 via the interface control circuit 4 and for the highlight point to be found in the host computer 13.

Furthermore, it would also be acceptable to determine the value of the obtained highlight point in the host computer 13, and to give to the CPU 1 instructions to perform the prescan again or instructions to perform the main scan depending on the results of this determination.

As described above, with the present invention the area of the picture image input region in which the picture image is input is found, the required minimum resolution is computed by dividing the required number of pixels set beforehand in picture input by this area which has been found, and picture image input for the picture image input region is accomplished at this required minimum resolution.

As a result, a number of pixels at least as large as a fixed value is input, and consequently the problem is avoided of the necessary amount of information not being obtainable because the number of pixels in the input picture image is too small when a histogram is obtained using the picture image input condition settings.

In addition, in the picture image input action of the prescan, the problem is avoided of the scan time becoming excessively long because the number of pixels in the input picture image is larger than necessary.

What is claimed is:

1. A picture image input method, wherein the picture image of an original medium is read and converted into picture image signal which is divided into a plurality of pixels by an image reading device, said method comprising the steps of:

designating an input region of said picture image;
calculating an area of a picture image input region which has been designated in said designating step;
computing a density value by dividing a predetermined number of pixels by said area;
setting a reading resolution of said image reading device based upon said density value; and
controlling said image reading device based upon the reading resolution which has been set in said setting step.

2. The picture image input method of claim 1, wherein:
picture image signal of a negative picture image is input;
a substantially minimum brightness value of the picture image signal is extracted as a shadow point; and
a base gradation conversion table is created for outputting a maximum value in accordance with an input of at least the shadow point.

3. The picture image input method of claim 1, wherein:
picture image signal of a positive picture image is input;
a substantially maximum brightness value of the picture image signal is extracted as a highlight point; and
a base gradation conversion table is created for outputting a maximum value in accordance with an input of at least the highlight point.

4. The picture image input method of claim 1, wherein:
a maximum value from a brightness value of a plurality of pixels included in the picture image signal which has been output by said image reading device is detected as a highlight point; and
exposure conditions during input of said picture image are set so that said highlight point falls within a predetermined range.

5. A picture image input device, comprising:
an image reading device which divides an original medium image into a plurality of pixels, reads the plurality of pixels and outputs an image signal;
a designating device which designates a picture image input region of said original medium;
an area calculation circuit which calculates the area of the image picture input region which has been designated by said designating device;
a division circuit which divides a number of specified pixels by said area and calculates a density value,
a resolution setting circuit which sets the reading resolution of said image reading device based upon said density value, and
a control circuit that controls said image reading device based upon the reading resolution set by said resolution setting circuit.

6. The picture image input device according to claim 5, further including:
an extracting circuit for extracting a substantially minimum brightness value of picture image signal input from a negative picture image; and
a gradation table creating circuit for creating a base gradation conversion table having a maximum value associated with said substantially minimum brightness value.

7. The picture image input device according to claim 5, further including:
an extracting circuit for extracting a substantially maximum brightness value of picture image signal input from a positive picture image; and
a gradation table creating circuit for creating a base gradation conversion table having a maximum value associated with said substantially maximum brightness.

8. The picture image input device according to claim 5, further including:
a highlight point detecting circuit which detects a maximum value from the brightness of a plurality of pixels included in the image signal which has been output by said image reading device as a highlight point;
a comparator circuit for comparing said maximum brightness value with a predetermined range of brightness values; and an exposure adjustment circuit for adjusting exposure conditions during input of said picture image based upon results obtained with said comparison means.

9. The picture image input device according to claim 8, wherein:

said exposure adjustment circuit increases a length of time of exposure when said maximum brightness value is less than or equal to the minimum value of said range of brightness values; and said exposure adjustment circuit decreases a length of time of exposure when said maximum brightness value is greater than or equal to the maximum value of said range of brightness values.

10. A picture image input method, comprising:

designating a picture image input region of picture image;

calculating an area of said designated picture image input region;

computing a density value by dividing a predetermined number of pixels by said area;

setting a reading resolution based upon said density value;

performing a prescan for creating a picture image data at said reading resolution;

creating a histogram from said picture image data input during said prescan step;

extracting a minimum brightness value and a maximum brightness value of said picture image data input during said prescan step;

creating a base gradation conversion table from said minimum and maximum brightness values; and performing a main scan using a look-up table that includes said base gradation conversion table.

11. A picture image input method, comprising:

designating a picture image input region of picture image;

calculating an area of said designated picture image input region;

computing a density value by dividing a predetermined number of pixels by said area;

setting a reading resolution based upon said density value;

performing a prescan for creating a picture image data at said reading resolution;

creating a histogram from said picture image data input during said prescan step;

determining a maximum brightness value of said picture image data obtained during said prescan step;

comparing said maximum brightness value with a range of brightness values; and adjusting exposure conditions during a main scan according to result of said comparison step.

12. The picture image input device of claim 5, further comprising a reading condition setting circuit which sets an image reading condition of said image reading device, based upon the image signal which has been output by said image reading device during reading at said reading resolution.

13. The picture image input device of claim 12, wherein the number of said specified pixels is the number of minimum pixels needed for the calculation of said image reading condition.

14. The image input device of claim 5, wherein said resolution setting circuit sets said density value as a resolution in said sub-scanning direction.

* * * * *